United States Patent [19]
Orsi

[11] Patent Number: 6,039,267
[45] Date of Patent: Mar. 21, 2000

[54] SELF-REGULATED FERTILIZING IRRIGATION SYSTEM WITH GROUND AND OVER-THE-CROP DISPENSING MEANS AND SNOW-FORMING FROST PROTECTION MEANS

[75] Inventor: Marco Orsi, Turin, Italy

[73] Assignee: Consulagri S.r.l., Torino, Italy

[21] Appl. No.: 09/202,032

[22] PCT Filed: Jun. 10, 1997

[86] PCT No.: PCT/EP97/03011

§ 371 Date: Dec. 7, 1998

§ 102(e) Date: Dec. 7, 1998

[87] PCT Pub. No.: WO97/47182

PCT Pub. Date: Dec. 18, 1997

[30] Foreign Application Priority Data

Jun. 13, 1996 [IT] Italy .............................. TO96U0132 U

[51] Int. Cl.[7] .............................. B05B 12/08; B05B 1/20
[52] U.S. Cl. .............................. 239/63; 239/75; 239/76; 239/266
[58] Field of Search .................................. 239/63, 66, 67, 239/69, 75, 76, 99, 101, 266, 267, 533.1, 533.15, 536; 137/118.01, 118.04, 118.06

[56] References Cited

U.S. PATENT DOCUMENTS

| | | | |
|---|---|---|---|
| 4,176,791 | 12/1979 | Cattaneo et al. ........................ | 239/76 |
| 4,177,947 | 12/1979 | Menzel . | |
| 5,465,905 | 11/1995 | Elder ........................................ | 239/75 |

FOREIGN PATENT DOCUMENTS

| | | |
|---|---|---|
| 2587170 | 3/1987 | France . |
| 95 24970 | 9/1995 | WIPO . |

Primary Examiner—Lesley D. Morris
Attorney, Agent, or Firm—Guido Modiano; Albert Josif

[57] ABSTRACT

A duct made of flexible material, comprising a plurality of spaced dispensers and regulator valves. Each dispenser is provided with two ports, one for ground dispensing and the other one for over-the-crop dispensing; the ports are controlled by respective differential membrane valves. The ports are supplied by separate system sections, one at low pressure and the other one at high pressure, which comprise respective pipes which are supplied by corresponding motorized pump units at low and high pressure respectively; the pipes are joined in a single duct with side-by-side passages provided with a cross-section shaped substantially like a figure-of-eight.

14 Claims, 4 Drawing Sheets

SELF-REGULATED FERTILIZING IRRIGATION SYSTEM WITH GROUND AND OVER-THE-CROP DISPENSING MEANS AND SNOW-FORMING FROST PROTECTION MEANS

BACKGROUND OF THE INVENTION

The present invention relates to self-regulated fertilizing irrigation systems and more specifically to systems of the kind described in prior Italian patent no. 1,061,205, which comprise a source of pressurized liquid, a duct made of flexible material, a plurality of spaced dispensers, and a regulator valve which is interposed between the source and the first dispenser of the duct.

Such systems are filled periodically, and after each filling the regulator valve, by comparing the delivery pressure with the pressure in the last portion of the duct, cuts off the delivery of the source, connecting the first portion of the duct to the discharge. Because of the consequent pressure decrease in said first duct portion, each one of the subsequent portions discharges in succession the accumulated volume of liquid through the dispenser which is arranged upstream of it with respect to the source. For this purpose, each dispenser is provided with a differential membrane valve which during filling cuts off the discharge port of the dispenser, allowing the liquid to pass from one duct portion to the other, and during discharge cuts off the passage of the liquid between the adjacent duct portions, simultaneously uncovering the discharge port of the dispenser interposed between them.

Each dispenser discharges, during each cycle, an amount of liquid (the so-called "trickle") which corresponds to the volume stored in the respective pressurized duct portion and dispenses said amount with a pressure which decreases rapidly starting from the maximum supply pressure.

Accordingly, in conventional systems, which are generally supplied at low pressure, the dispensers are directed exclusively towards the ground in order to concentrate irrigation at the base of the crops, since they are unable to effectively dispense a jet of water directed towards the head of said crops, owing to the sharp degradation of the pressure.

This is a drawback and a shortcoming of conventional systems of the specified type, which cannot be used for leaf treatments, irrigation or fertilizing irrigation, or for conventional frost protection treatments which cover the buds with a shield of ice obtained by spraying with nebulized water jets.

SUMMARY OF THE INVENTION

A principal aim of the present invention is substantially to eliminate these and other drawbacks of conventional systems, and within the scope of this general aim an important object of the present invention is to provide a system which is of the specified type but is "multifunctional", i.e., has improved dispensers which can dispense the irrigation or fertilizing irrigation or treatment liquid both onto the ground and selectively or simultaneously on the foliage of the crops according to the requirements of the various programmed actions.

Another object of the present invention is to provide a system which includes frost protection means constituted by diffusers adapted to form snow instead of ice, as in those currently commercially available.

Another important and particular object of the present invention is to provide a fertilizing irrigation system with improved dispensers which are adapted to produce selective dispensing on the ground or on the foliage of crops automatically according to the corresponding selective activation of pumping elements which are subjected to automatic control means.

Another important object of the present invention is to provide a system which is easy and handy to manage, allows extensive programmability of the operating sequences, and significantly reduces water and energy consumptions for an equal efficiency of the irrigation and/or fertilizing irrigation treatments.

According to the present invention, this aim and other important objects are achieved by providing a system of the cited type, having the specific characteristics stated in the appended claims.

Substantially, the present invention is based on the concept of improving the irrigation system, by providing it with dispensers which have two ports each, one for ground dispensing and the other one for over-the-crop dispensing, which are controlled by respective differential membrane valves, and by supplying said ports with separate system sections, respectively at low pressure and at high pressure. The two system sections comprise respective pipes, advantageously combined into a single duct structure with side-by-side passages and with a figure-of-eight cross-section, controlled by respective regulator valves and supplied by corresponding motorized pump units, respectively at low and high pressure. The two motorized pump units can be activated simultaneously or selectively, and in the second case there are also automatic control means, typically operated by air and/or ground temperature and humidity sensors, in order to individually activate one or the other of the motorized pump units and correspondingly produce ground or over-the-crop treatment according to operating requirements.

Another characteristic of the system according to the present invention consists of the fact that the high-pressure duct includes frost-protection diffuser means with air emulsion by Venturi effect in order to produce snow.

BRIEF DESCRIPTION OF THE DRAWINGS

Further characteristics and advantages of the improved system according to the present invention will become apparent from the following detailed description and with reference to the accompanying drawings, wherein.

DESCRIPTION OF THE PREFERRED EMBODIMENTS

Figure 1:
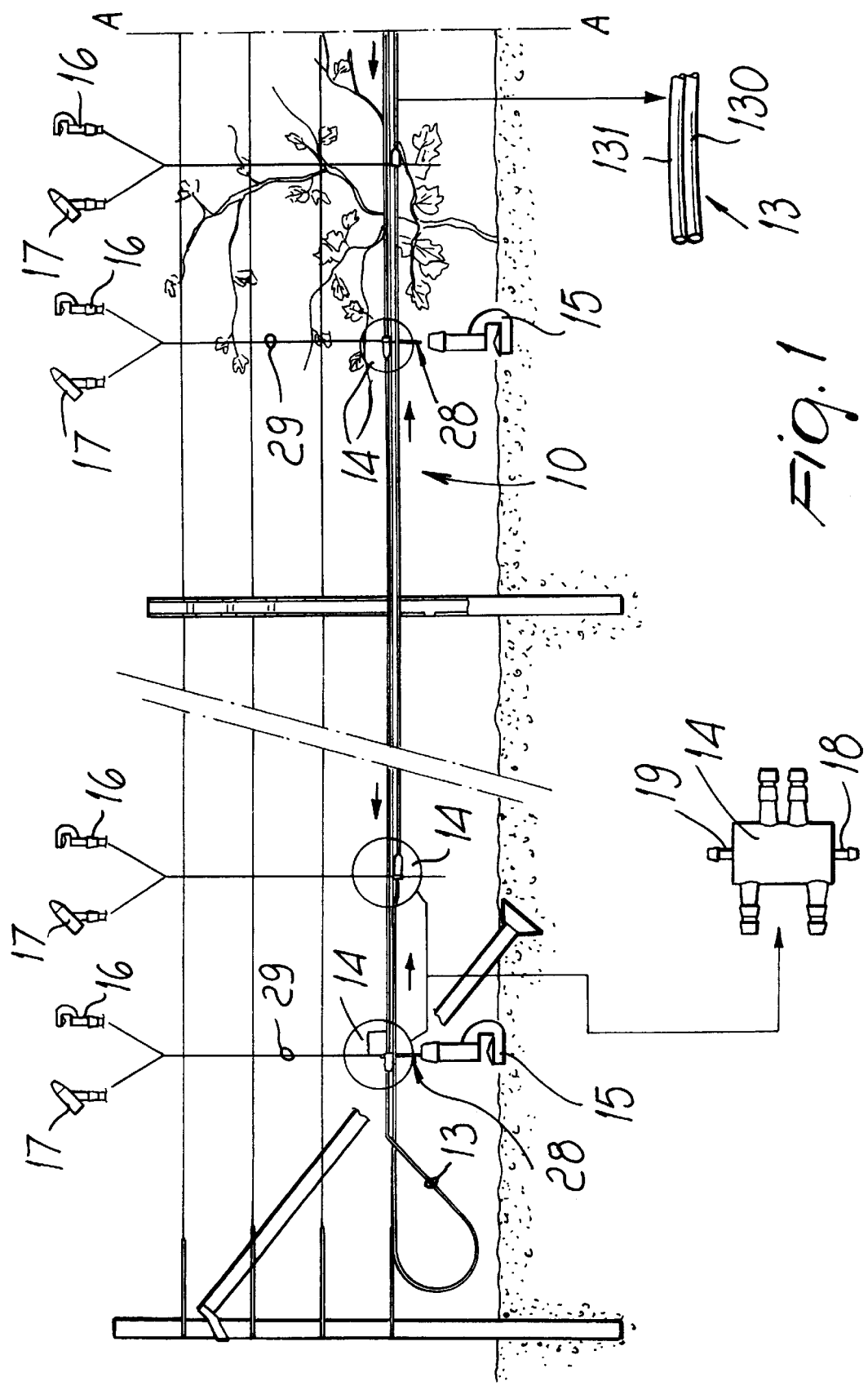
FIG. 1 is a schematic view of an improved irrigation system according to the present invention.
Figure 1A:
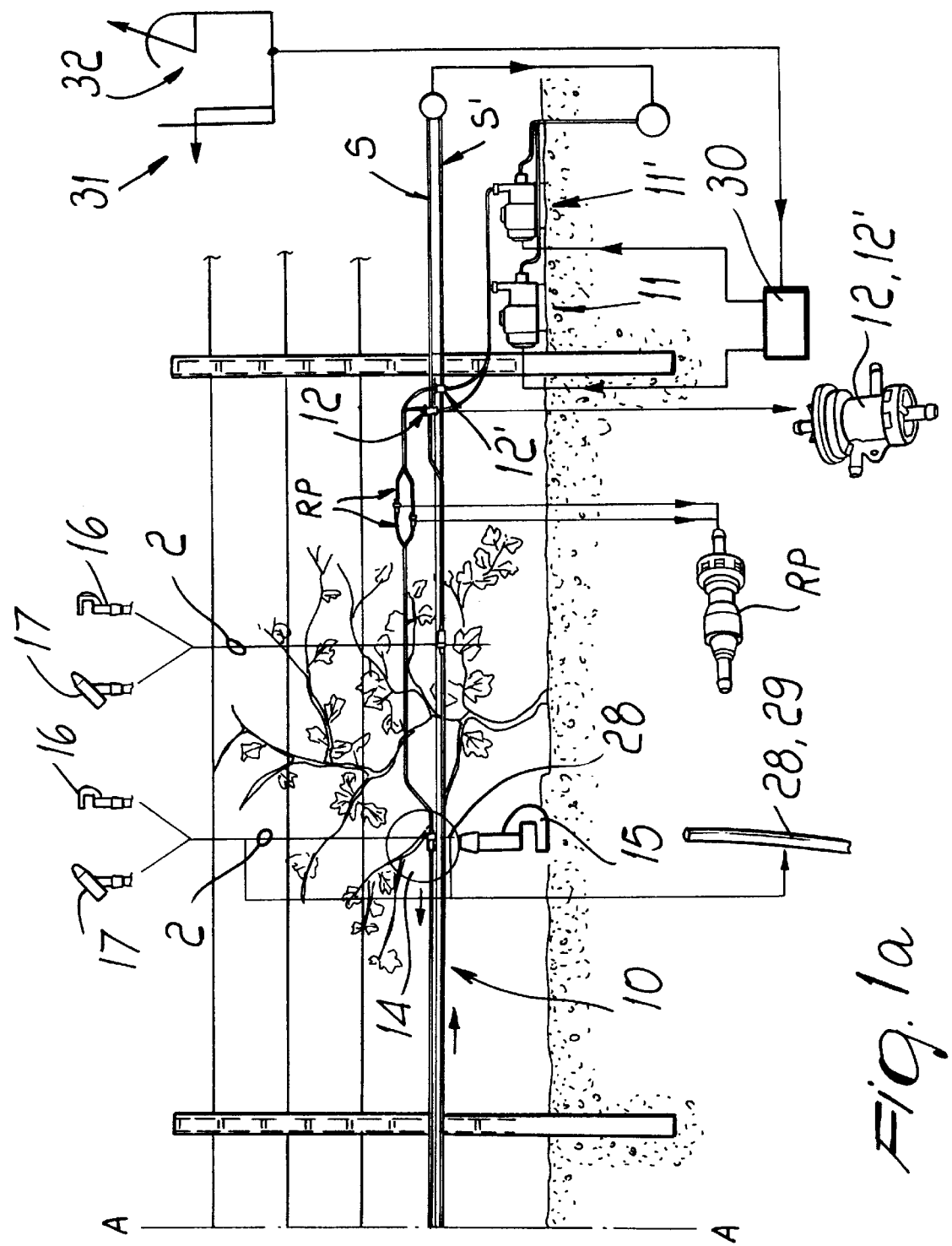
FIG. 1a shows the corresponding components of FIG. 1 in exploded and enlarged view for the sake of immediate comprehension.

In the drawings, the reference numeral 10 generally designates the entire irrigation system, which comprises two system sections which are supplied by respective sources of pressurized liquid, constituted by motorized pump units 11,11' at low pressure and high pressure respectively, and comprise regulator valves 12,12', pressure regulators RP, a duct generally designated by the reference numeral 13, a plurality of dispensers 14 arranged in series on the duct 13 and spaced by an appropriate extent chosen according to operating requirements, and a plurality of ground diffusers 15, over-the-crop diffusers 16, and frost-protection diffusers 17.

Each one of the regulator valves 12, of a conventional type, is provided to perform the cyclic filling of the respective system section and, after each filling, to cut off the water delivery from the respective source 11,11' and connect to the respective discharge S,S' the first duct portion 13 which lies between the regulator valve 12 and the dispenser 14. For this purpose, each valve 12,12', which is of the differential type, is capable of comparing the delivery pressure of the respective source 11,11' with the pressure in the last portion of the respective system section and to connect to the discharge the first portion of the respective duct when, the system section being full, these pressures equalize. An improved differential valve of this type is disclosed in Italian patent no. 1,241,687 and is assumed to be known to those skilled in the art.

Owing to the decrease in the pressure in the first duct portion of each system section, the subsequent portions discharge in succession the accumulated volume of liquid, each portion discharging through the dispenser 14 which lies upstream with respect to its source 11,11'. Each duct portion therefore constitutes a liquid reservoir, and for this purpose the duct is preferably made of a flexible material, typically polymeric material.

According to the present invention, each dispenser 14 is provided with two independent side-by-side portions, each having its own dispensing port 18,19, one for ground irrigation and one for over-the-crop irrigation or treatment.

Figure 4A:
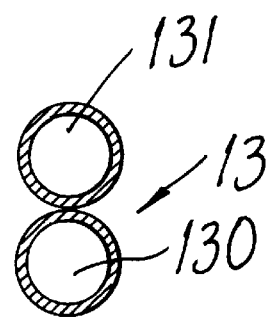
FIG. 4a is a sectional view, taken along the plane IVa—IVa of FIG. 4.
Figure 4:
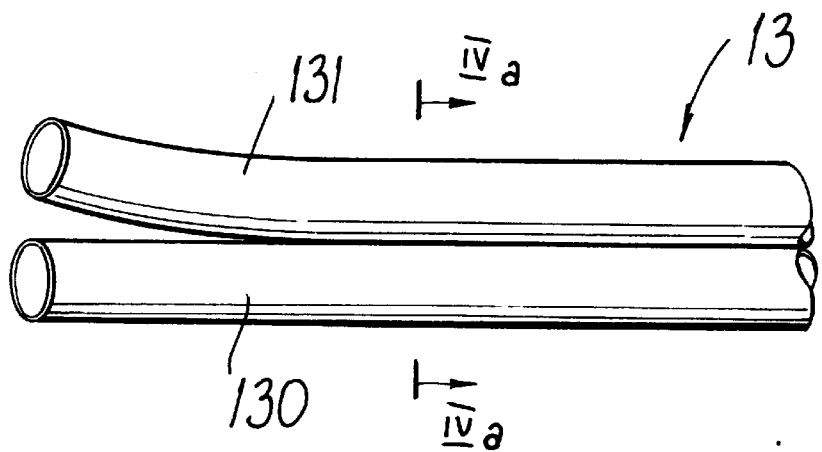
FIG. 4 is an elevation view of a segment of the duct with side-by-side passages.

Likewise, each dispenser 14 is supplied by a pair of pipes 130,131, at low and high pressure respectively, which constitute the two system portions, each of which is connected to the corresponding motorized pump unit 11,11' and comprises the respective regulator valve 12,12'. The two pipes 130,131 are combined in the single duct 13, which thus has two side-by-side passages and a corresponding cross-section which is substantially shaped like a figure-of-eight (FIG. 4a).

Figure 2:
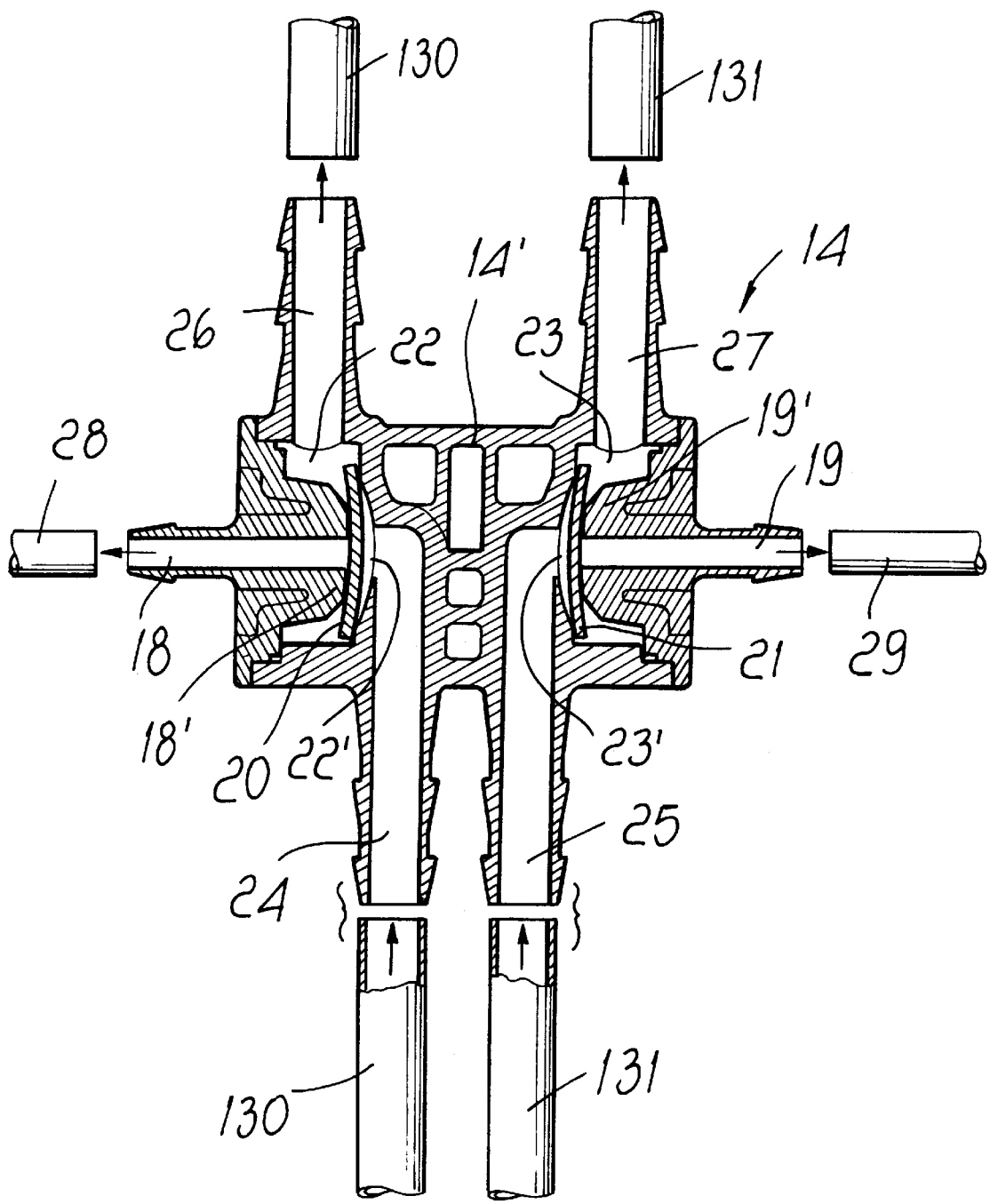
FIG. 2 is a longitudinal sectional view of a dual-port dispenser of the system of FIG. 1.

With reference specifically to FIG. 2, it can be seen that each dispenser 14 comprises two elastic membrane valves 20,21 for controlling the corresponding ports 18,19. The membrane valves 20,21 are accommodated in corresponding filling chambers 22,23 provided in corresponding adjacent and symmetrical sections of the body 14' of the dispenser 14, which is preferably made of polymeric material.

Each membrane rests on one side on a protruding end lip 18',19' of the corresponding port, and engages, on the other side, a circular edge which separates, in each filling chamber 22,23, a corresponding recessed chamber portion 22' and respectively 23'. Respective inlet ducts 24,25 for the treatment liquid are connected to the recessed portions of the filling chambers and respective outlet ducts 26,27 for the liquid branch off from said filling chamber.

Adjacent portions of the respective pipes 130,131 at low and high pressure are connected to the corresponding inlet and outlet ducts 24,26 and 25,27; the operating pressure of the pipe 130 is typically chosen equal to 3 bar and the operating pressure of the pipe 131 is typically chosen equal to 5 bar. Through single-pipe secondary duct branches 28 and 29, the port 18 of the dispenser 14 is connected to one or more ground diffusers 15, which are thus supplied at low pressure, and the port 19 is connected to one or more over-the-crop diffusers 16 and/or to frost-protection diffusers 17, which are thus supplied at high pressure.

Figure 3:
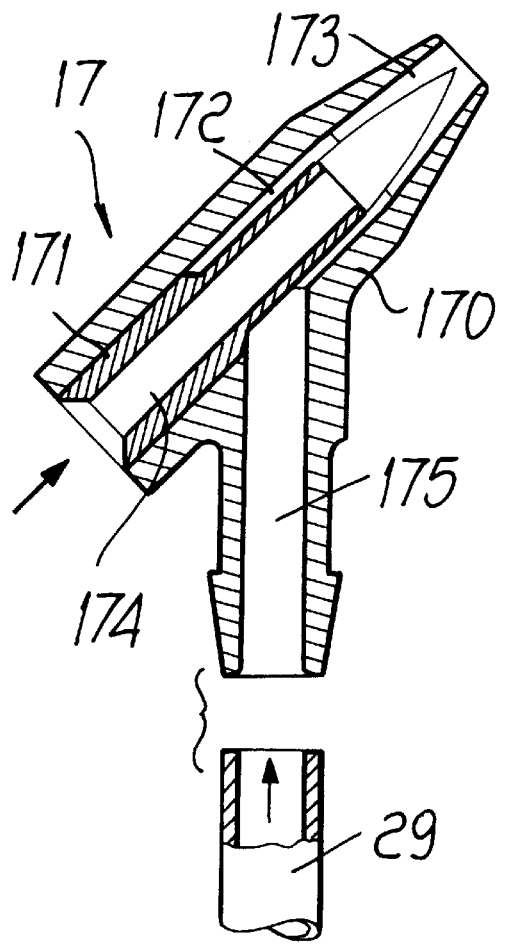
FIG. 3 is a sectional view of a frost-protection diffuser with Venturi-effect emulsifier.

FIG. 3 illustrates the structure of a frost-protection diffuser 17, which according to the present invention includes air emulsifying means adapted to produce snowflakes capable of protecting the buds of crops from the action of frost. For this purpose, the diffuser 17 comprises a body 170 inside which there is a cylindrical jacket 171 which forms an annular chamber 172 ending with a diffuser cone 173; the cylindrical jacket has an axial air intake duct 174 which also ends in the diffuser cone 173. The inlet duct 175 for the water supplied at high pressure by means of the secondary duct branch 19 leads into the annular chamber 172. The water accelerated in the annular chamber 172 decelerates and nebulizes in the diffuser cone 173 and forms a suction which draws air from the axial intake duct 174, said air being thus emulsified with the nebulized liquid.

Each section of the system operates independently but identically, and entails a filling step, during which the treatment liquid, pumped by the respective motorized pump unit 11,11', passes in succession through the various dispensers 14, passing from the respective inlet duct 24,25 into the filling chamber 22,23 through the circular edge that separates the recessed portion of each chamber and exiting from the respective outlet duct 26,27.

During this filling step, the elastic membranes 20,21, pushed by the filling pressure, adhere to the protruding end lips 18',19', cutting off the corresponding dispensing port 18,19.

During the subsequent dispensing step, since the liquid pressure in the inlet ducts 24,25 decreases, the liquid contained under pressure in the duct portions downstream of each dispenser flows back into the respective filling chamber 22,23 and pushes the respective membrane 20, 21 so that it sealingly engages against the circular edge of the recessed chamber portion, cutting off the connection of the corresponding filling chamber to the corresponding inlet duct and simultaneously opening the respective dispensing port 18,19.

The two system sections can be activated simultaneously or selectively. In the second case, the present invention also uses automatic control means 30, typically operated by air and/or ground temperature sensors 31 and humidity sensors 32 which are capable of individually activating either of the motorized pumps 11,11' and of correspondingly producing ground or over-the-crop treatment.

The effects of the present invention of course also cover systems which achieve equal utility by using the same innovative concept defined by the appended claims, wherein the reference numerals are included merely for the sake of better comprehension.

What I claim is:

1. A self-regulated fertilizing irrigation system, comprising at least one source of pressurized liquid, a duct made of flexible material, a plurality of spaced dispensers, and at least one regulator valve which is interposed between the source and the first dispenser of the duct, wherein each dispenser is provided with two ports, one for ground dispensing and the other one for over-the-crop dispensing, said ports being controlled by respective differential membrane valves and wherein said ports are supplied by separate system sections, one at low pressure and the other one at high pressure.

2. The system according to claim 1, wherein the two system sections comprise respective pipes which are controlled by respective regulator valves and are supplied by corresponding motorized pump units at low and high pressure respectively, which can be activated simultaneously or selectively.

3. The system according to claim 2, wherein said respective pipes are joined in a single duct with side-by-side passages, whose cross-section is substantially shaped like a figure-of-eight.

4. The system according to claim 3, wherein said single duct is made of polymeric material.

5. The system according to claim 1, wherein each dispenser is provided with two adjacent and symmetrical independent sections, each comprising a dispensing port controlled by a respective membrane valve, a filling chamber, an inlet duct for the entry of the treatment liquid into the respective filling chamber, and an outlet duct for the exit of the treatment liquid from said respective filling chamber.

6. The system according to claim 5, wherein each membrane valve rests, on one side, on a protruding end lip of the respective dispensing port and engages, on the other side, a circular edge which separates, in each filling chamber, a corresponding recessed portion ot the chamber.

7. The system according to claim 5, wherein the dispensing ports of each dispenser are connected, through respective single-tube secondary duct branches, to at least one ground diffuser which is supplied at low pressure and to at least one over-the-crop diffuser and/or frost-protection diffuser which are supplied at high pressure.

8. The system according to claim 7, wherein said at least one frost-protection diffuser comprises air emulsifying means which are adapted to produce snowflakes capable of protecting the buds of crops from the action of frost.

9. The system according to claim 7, wherein each frost-protection diffuser comprises a body inside which there is a cylindrical jacket which forms an annular chamber ending with a diffuser cone.

10. The system according to claim 9, wherein said cylindrical jacket is provided with an axial air intake duct which also ends in the diffuser cone.

11. The system according to claim 9, wherein a duct for the intake of water supplied at high pressure leads into the annular chamber.

12. The system according to claim 11, wherein said water, by nebulizing within the diffuser cone, draws air from said intake duct, said air emulsifying with the nebulized water.

13. The system according to claim 2, wherein it comprises automatic control means in order to individually and selectively activate one or the other of the motorized pump units and correspondingly produce ground or over-the-crop treatment.

14. The system according to claim 13, wherein said automatic control means are actuated by air and/or ground temperature sensors and humidity sensors.

* * * * *